(12) United States Patent
Chuang (10) Patent No.: US 8,293,166 B2
(45) Date of Patent: Oct. 23, 2012

(54) METHOD FOR MANUFACTURING LAMP SHELL

(76) Inventor: Sheng-Yi Chuang, Hsinchu (TW)

( * ) Notice: Subject to any disclaimer, the term of this patent is extended or adjusted under 35 U.S.C. 154(b) by 0 days.

(21) Appl. No.: 12/610,144

(22) Filed: Oct. 30, 2009

(65) Prior Publication Data

US 2010/0314808 A1    Dec. 16, 2010

(30) Foreign Application Priority Data

Jun. 12, 2009    (TW) ................................ 98119623 A (51) Int. Cl.
*B29C 49/64* (2006.01)
(52) U.S. Cl. ........ 264/521; 264/531; 264/534; 264/538; 264/537
(58) Field of Classification Search ........................ None
See application file for complete search history.

(56) References Cited

U.S. PATENT DOCUMENTS

| | | | | |
|---|---|---|---|---|
| 4,233,022 A | * | 11/1980 | Brady et al. | 425/525 |
| 5,660,905 A | * | 8/1997 | Mero et al. | 428/36.92 |
| 5,902,526 A | * | 5/1999 | Davis et al. | 264/40.1 |
| 6,361,192 B1 | * | 3/2002 | Fussell et al. | 362/331 |
| 6,428,737 B1 | * | 8/2002 | Collette et al. | 264/513 |

FOREIGN PATENT DOCUMENTS

| | | |
|---|---|---|
| TW | M317651 | 8/2007 |
| TW | M356835 | 5/2009 |
| TW | M358239 | 6/2009 |

OTHER PUBLICATIONS

Rosato, Dominick, Donald Rosato, and Marlene Rosato. Injection Molding Handbook. 3rd ed. Boston: Kluwer Academic Publishers. 2000. pp. 277, 1200-1203.*

* cited by examiner

*Primary Examiner* — Monica A Huson
(74) *Attorney, Agent, or Firm* — Muncy, Geissler, Olds & Lowe, PLLC (57) ABSTRACT

A method for manufacturing lamp shell to improve structural strength and light penetration includes steps of: providing a plastic material, injecting the plastic material into a injection molding equipment to form a preform containing a first space with an opening and a connecting section at one end and a closed another end to form a light penetrating section, and placing the preform in a blow molding equipment and blowing the plastic material by injecting gas to inflate the preform through gas pressure to form a second space at a greater size than the first space to become a lamp shell. The lamp shell thus formed has a greater structural strength to meet safety requirements, and also provides improved light penetration, and can reduce material consumption of the lamp shell to save production cost.

9 Claims, 7 Drawing Sheets

METHOD FOR MANUFACTURING LAMP SHELL

FIELD OF THE INVENTION

The present invention relates to a method for manufacturing lamp shell and particularly to a method for manufacturing lamp shell from plastic material for LED lamps.

BACKGROUND OF THE INVENTION

Advance of technology makes LED lamps that generate greater brightness and provide longer life span widely adopted on traffic lights and indication lights of electric appliances. With growing awareness of energy saving and reducing carbon footprint, LED lamps become a main focus these day to displace the conventional fluorescent lamps or tungsten incandescent lamps.

Figure 1:
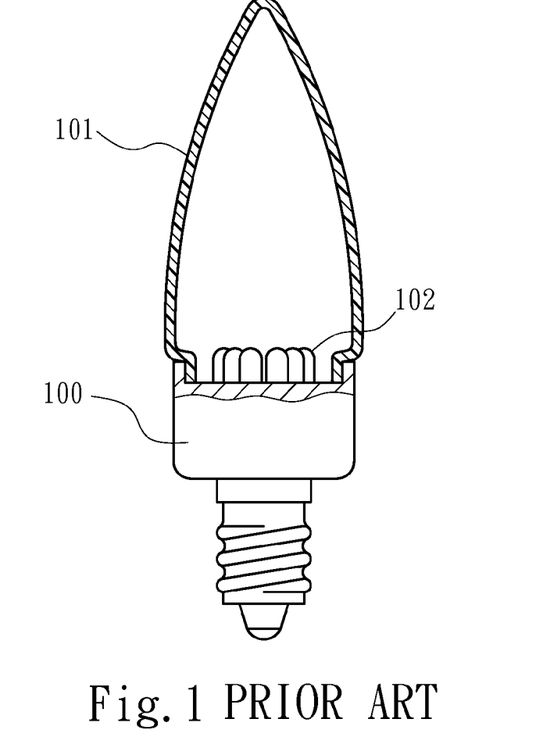
FIG. 1 is a sectional view of a conventional lamp shell.

The conventional structure of LED lamps can be found in prior art. For instance, R.O.C. patent Nos. M358239 and M356835 and FIG. 1 disclose the conventional LED lamps. As shown in FIG. 1, it has a base 100, a shell 101 connecting to the base 100 and a LED 102 held in the shell 101. The shell 101 usually is made from the plastic material. To facilitate mold releasing during production of the shell 101, a larger opening has to be formed on the shell 101 to connect to the base 100. This results in a weaker structural strength of the shell 101 that is not able to withstand a greater stress. Hence the shell 101 is easily fractured or shattered when subject to external impact. It does not fully meet safety requirements and has safety concern when in use. Moreover, the LED 102 could continuously emit strong light even if the shell 101 is broken away or shattered, it is irritating to user's eyes and repulsive.

To solve the aforesaid problem, techniques to increase the structural strength have been proposed. For instance, R.O.C. patent No. M317651 discloses a technique which is similar to FIG. 2. It also has a base 200, a shell 201 connecting to the base 200 and a LED lamp 202 held in the shell 201. It differs from the previously technique by having a smaller opening on the shell 201 to connect to the base 200 and can withstand a greater stress, thus provides a greater structural strength for the LED lamp.

Figure 2:
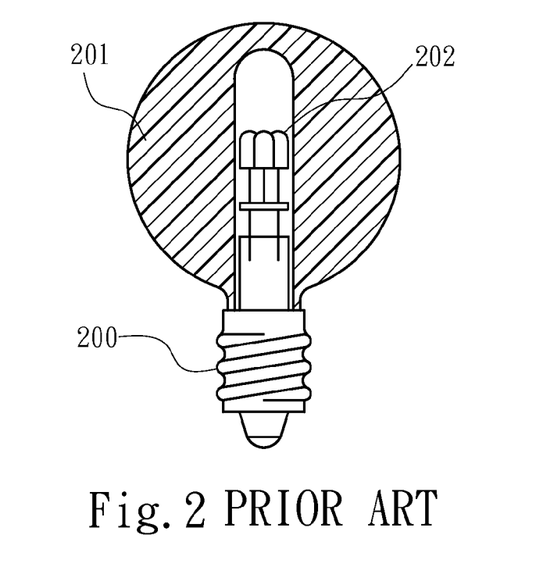
FIG. 2 is a sectional view of another conventional lamp shell.

The shell 201 shown in FIG. 2 also is made from the plastic material. In order to form the shell 201 with a smaller opening without affecting mold release, the space formed inside to hold the LED has to be uniform in diameter and smaller than the opening. This results in that the shell 201 usually has to be formed at a greater thickness, especially for a round-shaped shell 201. This also results in light penetration deficiency, and a greater number of LED 202 is needed to enhance the lighting brightness. As a result, energy consumption increases, and more plastic material is needed to make the shell 201 and production cost is higher.

SUMMARY OF THE INVENTION

The primary object of the present invention is to solve the aforesaid disadvantages and enhance the structural strength to meet safety requirements, and also to reduce lamp shell thickness to increase light penetration of the lamp shell.

To achieve the foregoing object, the present invention provides a method for manufacturing lamp shell that includes steps as follow:

preparing a plastic material;

injecting the plastic material into an injection molding equipment to form a preform which has a first space with an opening at one end to form a connecting section and another end closed to form a light penetrating section; and blowing the plastic material after having placed the preform in a blow molding equipment by injecting gas into the preform to inflate the preform through gas pressure to form a second space at a greater size than the first space to become a lamp shell.

According to an embodiment of the present invention, the step of injecting the plastic material may be preceded by a first heating step to heat the plastic material to facilitate injection of the plastic material; the step of blowing the plastic material may also be preceded by a second heating step to heat the preform to facilitate blowing of the plastic material, and the second heating step may be repeatedly performed as required; the step of blowing the plastic material may further be followed by a step of fabricating threads to form external screw threads on the connecting section, and a step of disposing a light source in the second space and yet a packaging step of connecting a lamp base which is electrically connected with the light source to the connecting section to form a lamp product.

Compared with the conventional techniques, the aforesaid method of the present invention provides many benefits, notably:

1. Improves the structural strength and enhances safety in use.
2. Increases light penetration and reduces production cost.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 3:
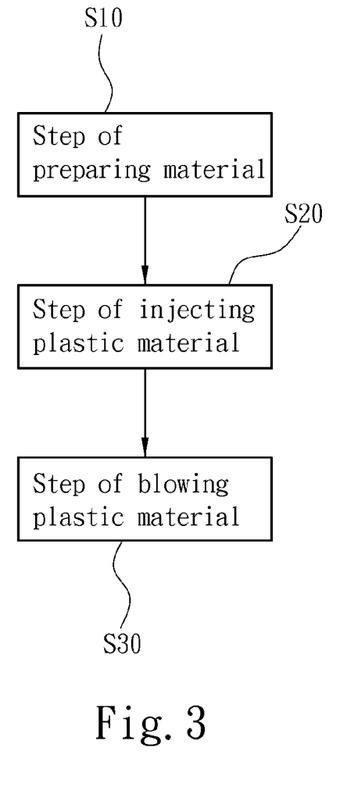
FIG. 3 is a flowchart of an embodiment of the present invention.

Please refer to FIG. 3 for an embodiment of the flowchart of the method for manufacturing lamp shell according to the present invention. It mainly includes the steps as follow:

1. Step S10 preparing material: Providing a plastic material.

2. Step S20 injecting plastic material: Injecting the plastic material into an injection molding equipment to form a preform which has a first space with an opening at one end to form a connecting section and another end closed to form a light penetrating section.

3. Step S30 blowing plastic material: Placing the preform in a blow molding equipment and inject gas into the preform to inflate the preform through gas pressure to form a second space at a greater size than the first space to become a lamp shell.

Figure 4:
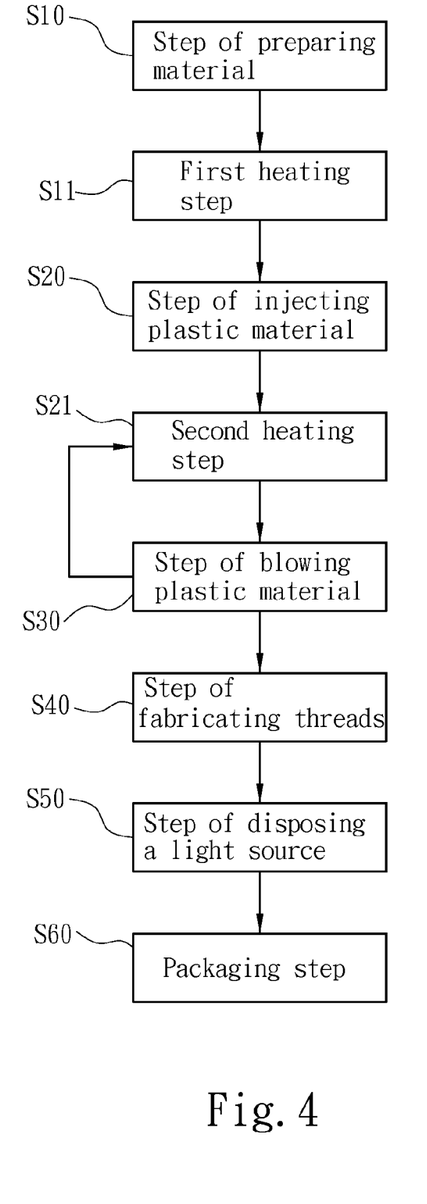
FIG. 4 is a flowchart of another embodiment of the present invention.
Figure 5A:
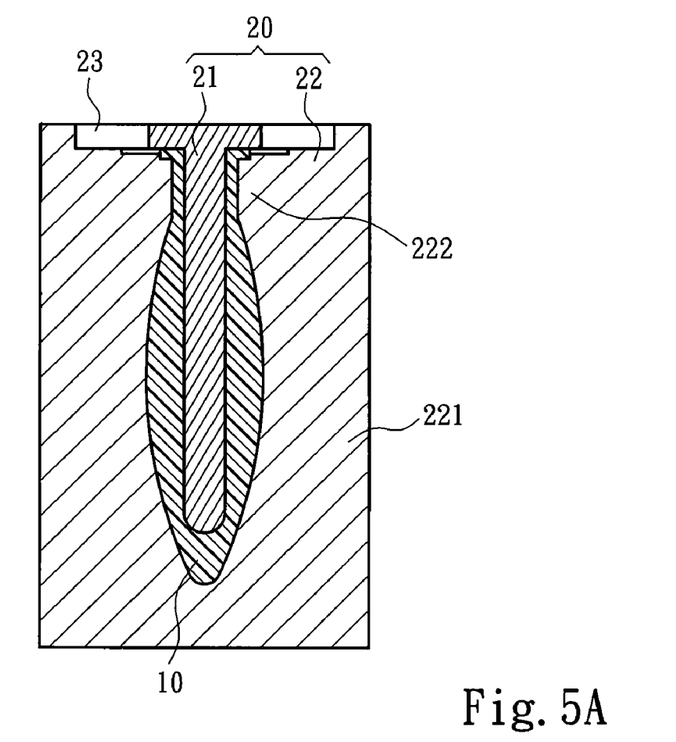
FIGS. 5A through 5F are schematic views of process steps according to the present invention.
Figure 5B:
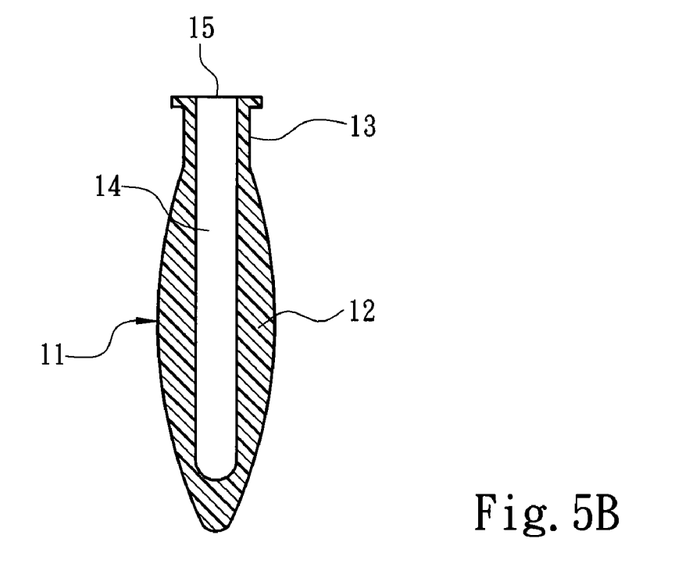
Figure 5C:
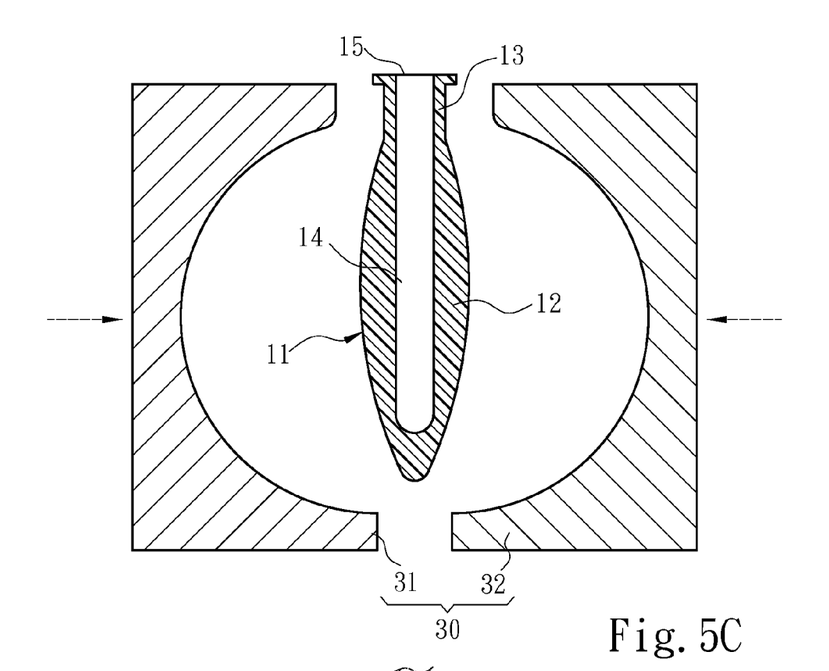
Figure 5D:
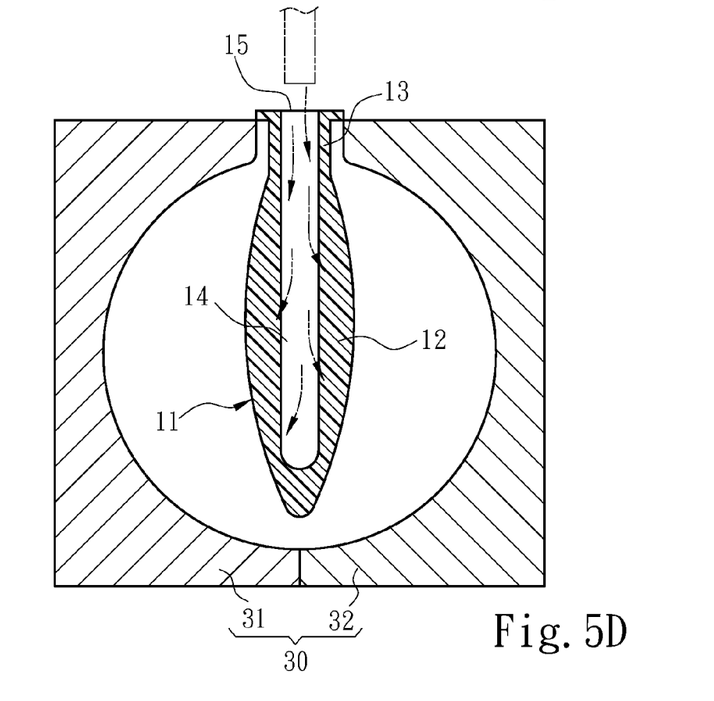
Figure 5E:
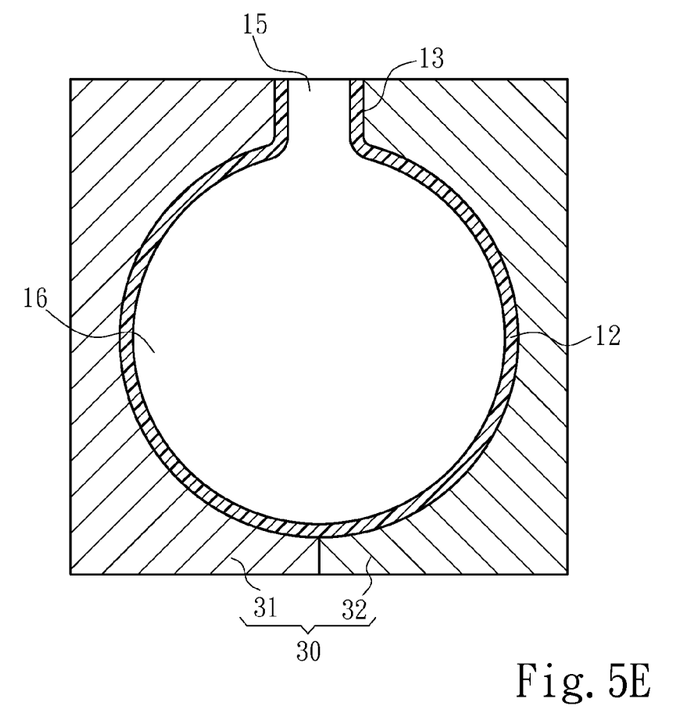
Figure 5F:
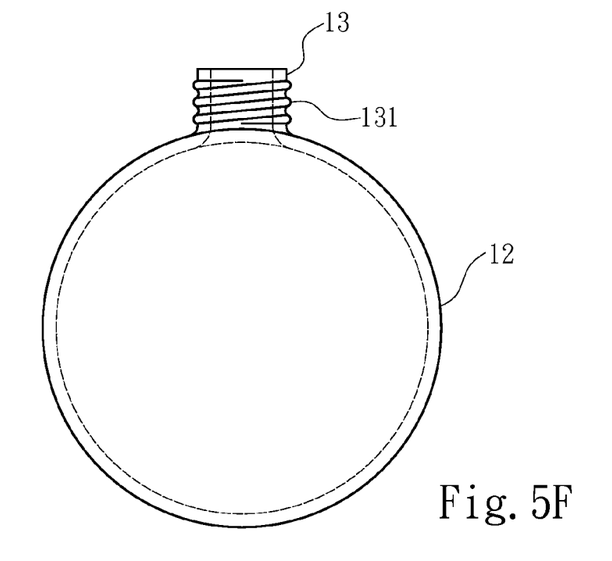

Refer to FIG. 4 for another embodiment of the flowchart of the method of the present invention. In this embodiment the step S20 of injecting plastic material is preceded by a first heating step S11 to heat the plastic material to facilitate injection molding, and a second heating step S21 preceding the step S30 of blowing plastic material to heat the preform to facilitate blowing of the plastic material. The second heating step S21 may be repeatedly performed as required. The step S30 of blowing plastic material is followed by a step S40 of fabricating threads to form external screw threads on the connecting section, and a step S50 of disposing a light source in the second space and yet a packaging step S60 to connect a lamp base which is electrically connected with the light source to the connecting section to form a lamp product.

Referring to FIGS. 5A through 5F, incorporating with FIGS. 3 and 4, during the manufacturing process, initially preparing material at the step S10 by providing a plastic material 10 which may be Polypropylene (PP), Polycarbonate (PC) or the like; next, at the first heating step S11 and the step S20 of injecting plastic material, heat the plastic material 10 and inject the plastic material into an injection molding equipment 20 which is a horizontal injection machine including a first mold 21 and a second mold 22 and an injection end 23 at an upper side of the first mold 21 and the second mold 22. The second mold 22 has a neck portion 222 at a top end thereof, which runs over into a body portion 221 having a partially larger opening width than the neck portion 222 The first mold 21 and the second mold 22 together form an injection chamber so that the injected plastic material 10 flows into the injection chamber at the top end and cools and solidifies to become a preform 11 in the injection molding equipment 20 that can be removed; the preform 11 has a first space 14 with an opening 15 and a connecting section 13 at one end and another end closed to form a light penetrating section 12 to join the connecting section 13; at the Step 20 the plastic material 10 is injected through the connecting section 13 so that when the preform 11 is formed and released from the first mold 21 and the second mold 22, no residual material is formed on the light penetrating section 12, thus it is more aesthetic appealing. After the preform 11 has been formed at the step S20, proceed a second heating step S21 and step S30 of blowing plastic material; dispose the preform 11 in a blow molding equipment 30 which is a two-step stretch blowing machine holding at least two corresponding molds 31 and 32; injecting gas into the preform 11 to inflate the preform 11 through the gas pressure so that the first space 14 is expanded to become a second space 16 of a greater size. Thus a lamp shell is formed.

During the step S30 of blowing plastic material the second heating step S21 may be repeatedly performed as required to facilitate blowing of the plastics to form the lamp shell as desired; The step S30 of blowing plastic material may further be followed by a step S40 of fabricating threads to form external screw threads 131 on the connecting section 13. The external screw threads 131 may also be formed by a separated fabrication process, or formed concurrently on the connecting section 13 through the injection molding equipment 20 at the step S20 by forming corresponding threads on the first mold 21 and the second mold 22, or even formed concurrently on the connecting section 13 through the blow molding equipment 30 at the step S30 by forming corresponding threads on the molds 31 and 32 so that after the preform 11 is blown in the blow molding equipment 30 the external screw threads 131 are also formed on the connecting section 13 at the same time.

Figure 6:
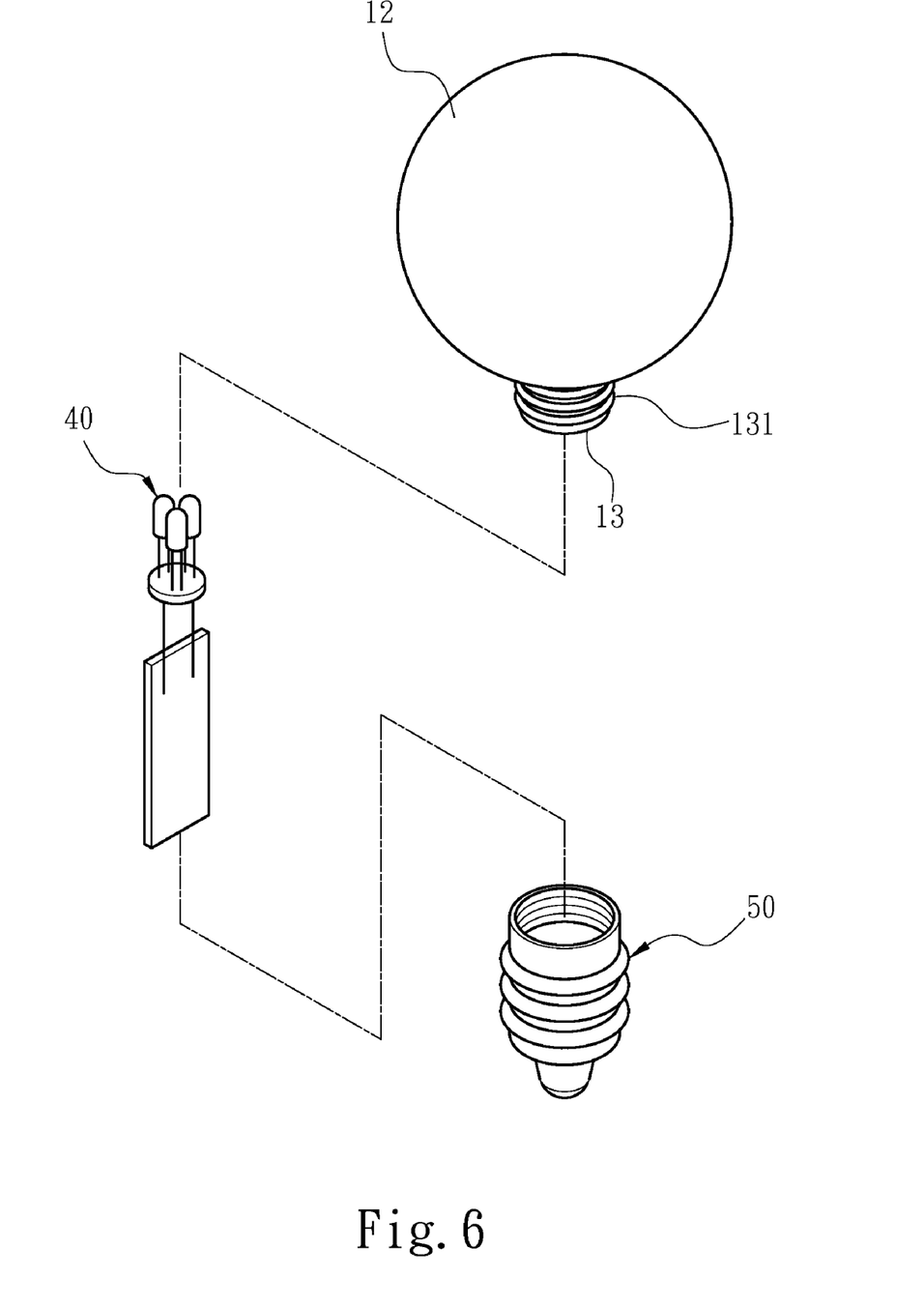
FIG. 6 is a schematic view of assembling the lamp according to the present invention.
Figure 7:
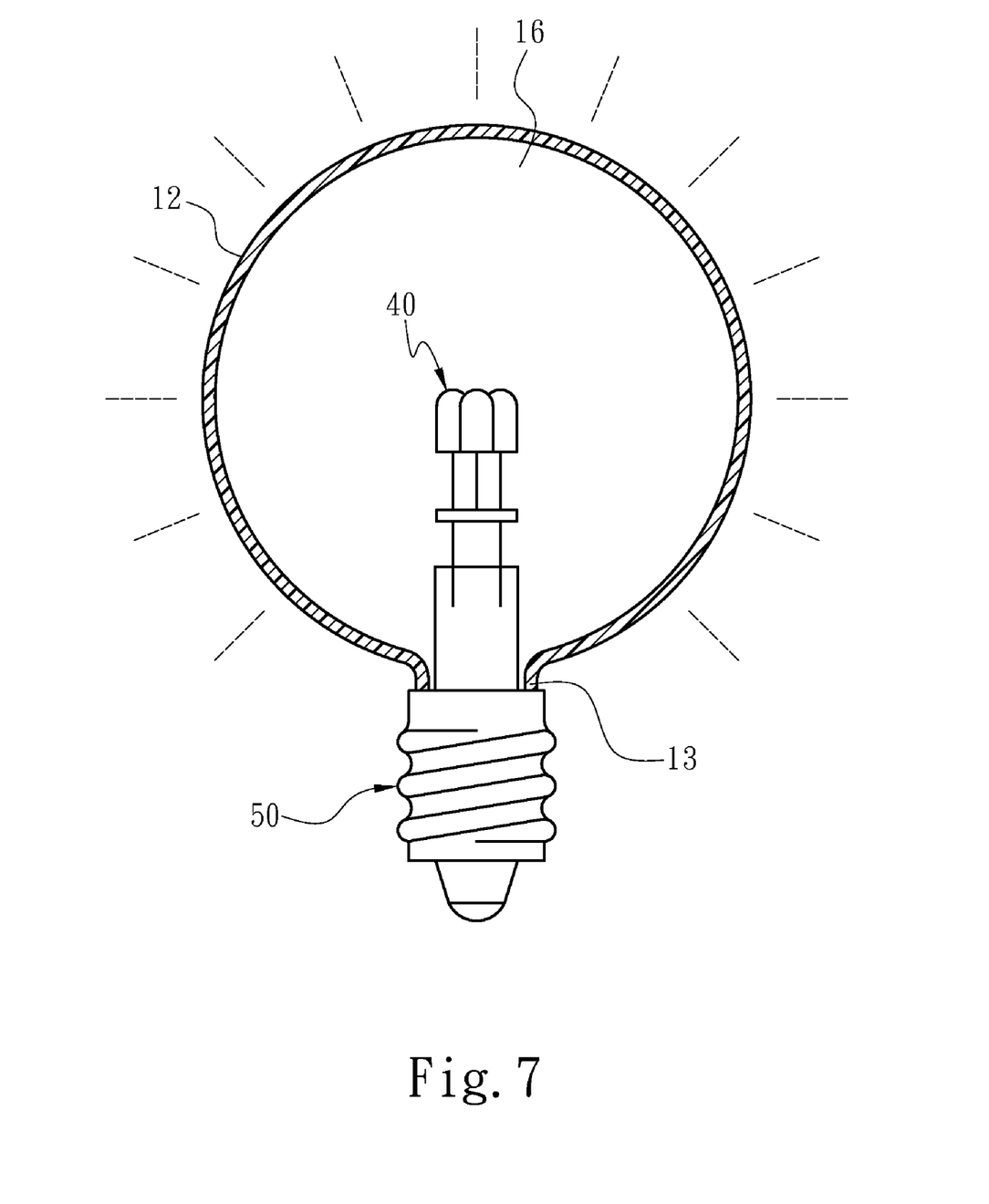
FIG. 7 is a schematic view of the present invention in a use condition.

After the lamp shell is formed at the step S30 of blowing plastic material, assembly of the lamp can be proceeded as shown in FIG. 6 at the step S50 of disposing a light source 40. The light source 40 is an LED shown in FIG. 6. Then a packaging step S60 can be performed to connect the lamp base 50 which is electrically connected with the light source 40 to the connecting section 13 to form the lamp product. The connecting section 13 and the lamp base 50 are connected with each other by using an adhesive, or screwing on the lamp base 50 through the external screw threads 131. Then the lamp product is formed. The lamp product thus formed as shown in FIG. 7 with the lamp shell of the present invention has a greater structural strength and less likely to shatter upon impact, and can meet UL standards. The lamp shell made through the present invention also has a thinner thickness with enhanced light penetration. Thus fewer light source 40 is required to be deployed in the lamp shell to save energy. The material needed to manufacture the lamp shell also can be reduced. Hence the total production cost is lower.

As a conclusion, the method for manufacturing lamp shell according to the present invention mainly includes two process steps: the step S20 of injecting plastic material to form the preform 11 with the first space 14 inside, and the step S30 of blowing plastic material to inject gas to inflate the preform 11 to form the second space 16 at a greater size than the first space 14. The lamp shell thus formed has a thinner thickness and improved light penetration. The structural strength also is greater and less likely to shatter under impact, hence the safety in use also is enhanced. Moreover, at the step S20 the plastic material 10 is injected from the upper end of the injection molding equipment 20 through the connecting section 13, hence no residual material remains on the light penetration section 12 and a smooth curved surface can be formed to further enhance light penetration and aesthetic appeal.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method for manufacturing lamp shell, comprising the steps of:

preparing a plastic material;

injecting the plastic material into an injection molding equipment, the injection molding equipment including a first mold half and a second mold half, wherein the second mold half has a neck portion at a top end thereof, which runs over into a body portion having a partially larger opening width than the neck portion, wherein the first and the second mold halves together form an injection chamber and wherein the plastic material is injected into the injection chamber at the top end and between the first and the second mold halves to form a preform which has a first space with an opening at one end to form a connecting section corresponding to the neck portion and another end closed to form a light penetrating section corresponding to the body portion, wherein the light penetrating section has a greater thickness than the connecting section;

releasing and removing the preform from the first and second mold halves after being cooled and solidified;

heating the performing to facilitate blowing the plastic material; and blowing the plastic material after having placed the preform in a blow molding equipment by injecting gas into the preform to inflate the preform through gas pressure to form a second space at a greater size than the first space to become a lamp shell.

2. The method of claim 1, wherein the step of injecting the plastic material is preceded by a first heating step to heat the plastic material to facilitate injecting the plastic material.

3. The method of claim 1, wherein the step of injecting the plastic material injects the plastic material through a location on the injection molding equipment corresponding to the connecting section.

4. The method of claim 1, wherein the second heating step is repeatedly performed during the step of blowing the plastic material.

5. The method of claim 1, wherein the connecting section forms external screw threads in the injection molding equipment at the step of injecting the plastic material concurrently.

6. The method of claim 1, wherein the connecting section forms external screw threads in the blow molding equipment at the step of blowing the plastic material concurrently.

7. The method of claim 1, wherein the step of blowing the plastic material is followed by a step of fabricating threads to form external screw threads on the connecting section.

8. The method of claim 1, wherein the step of blowing the plastic material is followed by a step of disposing a light source in the second space and a packaging step to connect a lamp base which is electrically connected with the light source to the connecting section to form a lamp product.

9. The method of claim 8, wherein the light source is a light emitting diode (LED).

* * * * *